United States Patent Office.

GEORGE MOHLER, OF YATES CITY, ILLINOIS.

Letters Patent No. 82,541, dated September 29, 1868.

IMPROVED MEDICAL COMPOUND.

The Schedule referred to in these Letters Patent and making part of the same.

TO ALL WHOM IT MAY CONCERN:

Be it known that I, GEORGE MOHLER, of Yates City, in the county of Knox, and in the State of Illinois, have invented certain new and useful Improvements in Medical Compound; and do hereby declare that the following is a full, clear, and exact description thereof.

My invention consists in a compound for the cure of consumption, bronchitis, asthma, and all other diseases of the breast or lungs, and is composed of the following ingredients, viz:

Extract *Cannabis Indicæ*, one ounce; extract Calabr. licorice, three ounces; tincture cubebs, one-fourth ounce; tincture quassia, one-fourth ounce; extract sarsaparilla, one-fourth ounce; salts of tartar, one ounce; which are dissolved and mixed with a sufficient quantity of pure water to make one quart of mixture.

I do not confine myself to the exact proportions mentioned, but vary them according to circumstances.

What I claim as new, and desire to secure by Letters Patent, is—

The compound above described, when composed and used substantially as and for the purposes herein set forth.

In testimony that I claim the foregoing, I have hereunto set my hand, this 23d day of May, 1868.

GEORGE MOHLER.

Witnesses:
    WM. McGOWAN,
    WM. M. SHERMAN.